(12) United States Patent
Doida

(10) Patent No.: US 8,526,680 B2
(45) Date of Patent: Sep. 3, 2013

(54) IMAGE PROCESSING METHOD, IMAGE PROCESSING PROGRAM, IMAGE PROCESSING DEVICE, AND IMAGING DEVICE

(75) Inventor: Shigeru Doida, Machida (JP)

(73) Assignee: Nikon Corporation, Tokyo (JP)

( * ) Notice: Subject to any disclaimer, the term of this patent is extended or adjusted under 35 U.S.C. 154(b) by 1227 days.

(21) Appl. No.: 12/083,553

(22) PCT Filed: Nov. 1, 2006

(86) PCT No.: PCT/JP2006/321904
§ 371 (c)(1),
(2), (4) Date: Apr. 14, 2008

(87) PCT Pub. No.: WO2007/063675
PCT Pub. Date: Jun. 7, 2007

(65) Prior Publication Data
US 2009/0052788 A1    Feb. 26, 2009

(30) Foreign Application Priority Data

Nov. 30, 2005    (JP) ................................. 2005-345715

(51) Int. Cl.
*G06K 9/00* (2006.01)
*G06K 9/46* (2006.01)

(52) U.S. Cl.
USPC .......................................... 382/107; 382/236

(58) Field of Classification Search
USPC ................. 382/100, 103, 107, 115, 168, 173, 382/181, 190, 194, 199, 203, 209, 291, 236; 348/153–155, 169–172, 208.1, 208.99, 239, 348/699; 375/240.12, 240.16, 240.24; 342/90; 345/158; 356/27–28, 28.5

See application file for complete search history.

(56) References Cited

U.S. PATENT DOCUMENTS

| | | | |
|---|---|---|---|
| 5,237,405 | A | 8/1993 | Egusa et al. |
| 5,469,274 | A | 11/1995 | Iwasaki et al. |
| 5,563,652 | A | 10/1996 | Toba et al. |

(Continued)

FOREIGN PATENT DOCUMENTS

| | | |
|---|---|---|
| JP | A-04-180370 | 6/1992 |
| JP | A-05-260264 | 10/1993 |

(Continued)

OTHER PUBLICATIONS

May 27, 2010 European Search Report issued in European Patent Application No. 10003785.

(Continued)

*Primary Examiner* — Hadi Akhavannik
*Assistant Examiner* — Mehdi Rashidian
(74) *Attorney, Agent, or Firm* — Oliff & Berridge, PLC

(57) ABSTRACT

An image-processing method is characterized by including a searching operation of searching for a local motion vector from each of blocks in the plural images, an electing operation of electing a representative motion vector from the local motion vectors of the respective blocks, and an approximating operation of approximating a motion vector distribution on the images based on the representative motion vector in order to detect motion between plural images with high precision without increasing the number of blocks made by dividing an image. In addition, when an approximate surface thereof is a plane, the operation amount for approximating the motion vector distribution and the information amount for representing the motion vector distribution can be minimized.

9 Claims, 7 Drawing Sheets

(56) References Cited

U.S. PATENT DOCUMENTS

| | | | |
|---|---|---|---|
| 5,648,815 A | 7/1997 | Toba | |
| 6,284,711 B1 | 9/2001 | Evans et al. | |
| 6,330,282 B1* | 12/2001 | Miyazaki | 375/240.16 |
| 7,758,507 B2* | 7/2010 | Yoshikawa et al. | 600/441 |
| 2001/0048757 A1 | 12/2001 | Oosawa | |
| 2002/0015513 A1* | 2/2002 | Ando et al. | 382/107 |
| 2003/0072373 A1 | 4/2003 | Sun | |
| 2004/0081360 A1 | 4/2004 | Lee et al. | |
| 2005/0089100 A1* | 4/2005 | Arita et al. | 375/240.16 |
| 2005/0163218 A1 | 7/2005 | Le Clerc et al. | |
| 2008/0107186 A1* | 5/2008 | Brusnitsyn et al. | 375/240.28 |
| 2010/0086053 A1* | 4/2010 | Okada et al. | 375/240.16 |
| 2010/0118156 A1* | 5/2010 | Saito | 348/208.6 |

FOREIGN PATENT DOCUMENTS

| | | |
|---|---|---|
| JP | A-07-038800 | 2/1995 |
| JP | A-2002-32735 | 1/2002 |
| JP | A-2004-343483 | 12/2004 |
| WO | WO 2004/084141 A1 | 9/2004 |

OTHER PUBLICATIONS

May 8, 2012 Notification of Reasons for Refusal issued in Japanese Patent Application No. 2007-547880 w/translation.

* cited by examiner

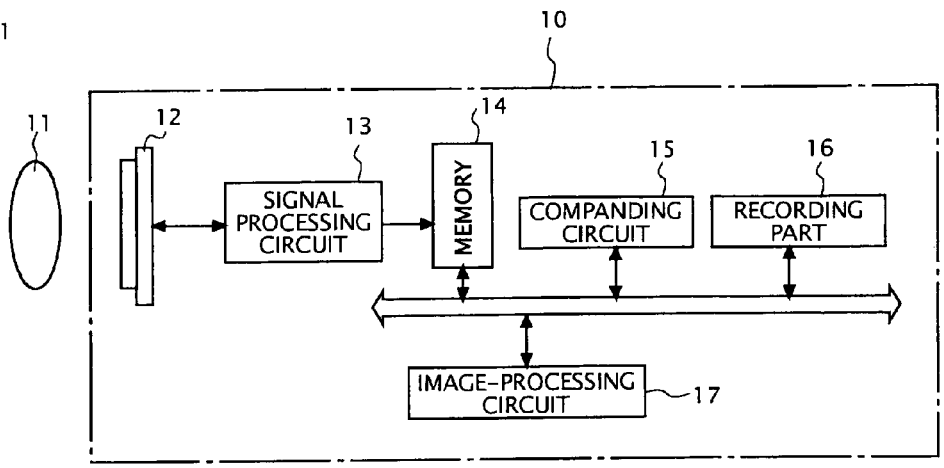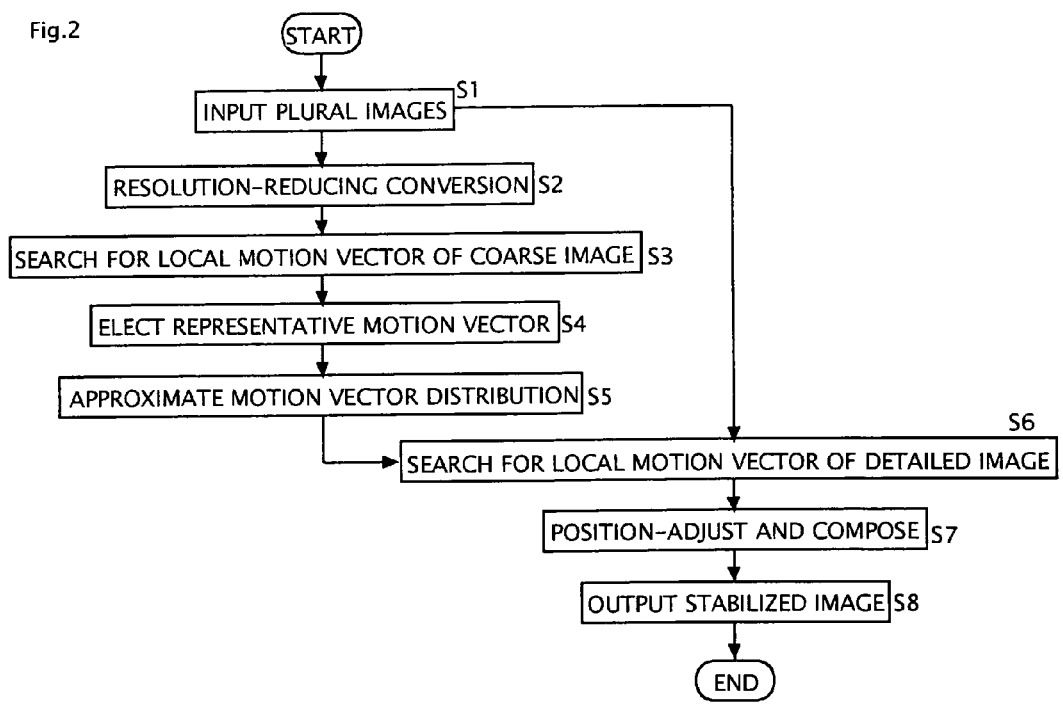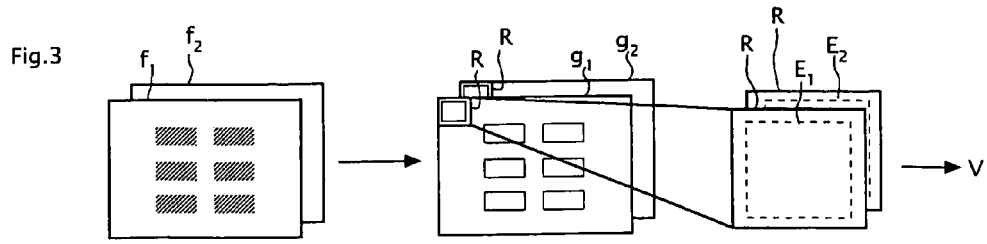

IMAGE PROCESSING METHOD, IMAGE PROCESSING PROGRAM, IMAGE PROCESSING DEVICE, AND IMAGING DEVICE

CROSS-REFERENCE TO RELATED APPLICATION

This application is a U.S. National Stage application claiming the benefit of prior filed International Application Number PCT/JP2006/321904, filed Nov. 1, 2006, in which the International Application claims a priority date of Nov. 30, 2005 based on prior filed Japanese Application Number 2005-345715, the entire contents of which are incorporated herein by reference.

TECHNICAL FIELD

The present invention relates to an image-processing method and an image-processing program which are applied to a digital camera, image-processing software, or the like. Further, the present invention relates to an image-processing apparatus which is applied to a digital camera and to an imaging apparatus such as a digital camera.

BACKGROUND ART

Image stabilization by digital processing detects a motion vector between plural images which are photographed continuously, and position-adjusts and composes the images according to the motion vector. A method of detecting the motion vector is disclosed in the Patent Document 1 or the like, which detects, for example, a motion vector (local motion vector) from each block of plural images and obtains one motion vector of the entire image based on the local motion vector of each block.

Patent Document 1: Japanese Unexamined Patent Application Publication No. H07-38800

DISCLOSURE

Problems to be Solved

However, a local motion vector with low reliability is mixed in the local motion vectors. Thus, the number of blocks needs to be increased so as to improve accuracy of detecting the motion vector by this method, and the operation amount increases by the quantity of increased blocks. Moreover, depending on a manner of movement between images, there may be a case that the motion vector does not represent the motion precisely.

Accordingly, an object of the present invention is to provide an image-processing method, an image-processing program, an image-processing apparatus, and an imaging apparatus which are capable of detecting motion between plural images with high precision without increasing the number of blocks.

Means for Solving the Problem

A first image-processing method according to the present invention is an image-processing method which detects motion between plural images, and is characterized by including a searching operation of searching for a local motion vector from each of blocks in the plural images, an electing operation of electing a representative motion vector from the local motion vectors of the respective blocks, and an approximating operation of approximating a motion vector distribution on the images based on the representative motion vector.

In addition, it is preferable that at least three of the representative motion vectors are elected, and the motion vector distribution is approximated by a linear function of a position on the images.

Further, it is preferable that in searches of the respective blocks, two types of projected data made by adding in two directions feature quantities of reference areas in the blocks are used.

Further, it is preferable that in searches of the respective blocks, two types of cumulative added images are created in advance, which are made by cumulatively adding in the two directions the feature quantities of the blocks, and the two types of projected data are created from a part of the two types of cumulative added images.

Further, a calculating processing of the motion vector distribution by the searching operation, the electing operation, and the approximating operation may be performed on plural coarse images made by performing resolution-reducing conversion of the plural images.

Furthermore, using the motion vector distribution calculated from the plural coarse images, motion between plural detailed images before being subjected to the resolution-reducing conversion may be detected.

Further, the plural detailed images may be position-adjusted and configured based on the detected motion.

Further, a first image-processing program according to the present invention is characterized by being configured to cause a computer to execute any one of the first image-processing methods according to the present invention.

Further, a first image-processing apparatus according to the present invention is characterized by including a unit which executes any one of the first image-processing methods according to the present invention.

Further, a first imaging apparatus according to the present invention is characterized by including an imaging unit capable of continuously imaging a subject to obtain plural images, and any one of the first image-processing apparatuses according to the present invention.

(Second Invention)

A second image-processing method according to the present invention is an image-processing method which searches for a motion vector between plural images, and is characterized by including a calculating operation of calculating a correlation between reference areas in the plural images while shifting positions of the reference areas between the images, in which a correlation between two types of projected data made by adding in two directions feature quantities of the reference areas is calculated as the correlation between the reference areas.

In addition, it is preferable that in the calculating operation, two types of cumulative added images are created in advance, which are made by cumulatively adding in the two directions the feature quantities of the reference areas, and the two types of projected data are created from a part of the two types of cumulative added images.

Further, it is preferable that the feature quantities of the reference areas are extracted by performing two or more processings on the reference areas.

Further, it is preferable that one of the two or more processings is an edge-detecting filter processing.

Further, the motion vector may be a motion vector of a block made by dividing the images.

Further, the motion vector may be a motion vector of the entire images.

Further, a second image-processing program according to the present invention is characterized by being configured to cause a computer to execute any one of the second image-processing methods according to the present invention.

Further, a second image-processing apparatus according to the present invention is characterized by including a unit which executes any one of the second image-processing methods according to the present invention.

Further, a second imaging apparatus according to the present invention is characterized by including an imaging unit capable of continuously imaging a subject to obtain plural images, and the second image-processing apparatus according to the present invention.

Effects

According to the present invention, there are realized an image-processing method, an image-processing program, an image-processing apparatus, and an imaging apparatus which are capable of detecting motion between plural images with high precision.

BRIEF DESCRIPTION OF THE DRAWINGS

FIG. 1 is a block diagram showing a structure of an electronic still camera of a first embodiment.

FIG. 2 is a flowchart showing a flow of an image stabilization processing.

FIG. 3 is a view explaining the principle of step S3.

DETAILED DESCRIPTION OF THE EMBODIMENTS

First Embodiment

Figure 4:
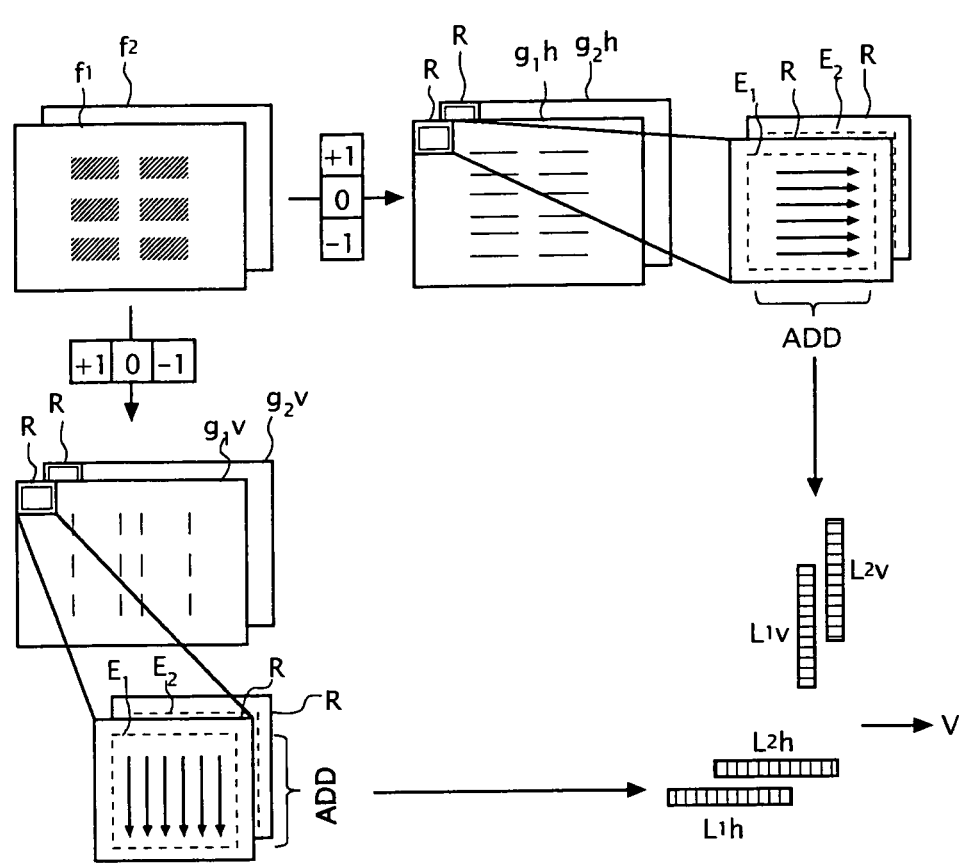
FIG. 4 is a view explaining the step S3 when using projected data.

Hereinafter, a first embodiment of the present invention will be explained. This embodiment is an embodiment of an electronic still camera having an image-stabilizing function.

FIG. 1 is a block diagram showing the structure of an electronic still camera. As shown in FIG. 1, in the electronic still camera 10, there are arranged an imaging sensor 12, a signal-processing circuit 13, a memory 14, a companding circuit 15, a recording part 16, and an image-processing circuit 17.

A shooting lens 11 attached to the electronic still camera 10 forms an optical image of a subject on the imaging sensor 12. The imaging sensor 12 images the optical image of the subject to obtain an image. This image is processed in the signal-processing circuit 13 and thereafter stored temporarily in the memory 14. The image-processing circuit 17 performs an image-processing on the image, and the image after the image-processing is subjected to a compression processing in the companding circuit 15 and thereafter recorded in the recording part 16.

Particularly, when the electronic still camera 10 is set to an image stabilization mode, the imaging sensor 12 obtains 2×n number of images at infinitesimal time intervals with underexposure of n levels relative to a proper exposure time or an exposure time set in advance. The image-processing circuit 17 inputs the plural images and executes an image stabilization processing to obtain a stabilized image. The stabilized image is recorded in the recording part 16 via the companding circuit 15.

Next, an overall flow of the image stabilization processing by the image-processing circuit 17 will be explained.

FIG. 2 is a flowchart showing a flow of the image stabilization processing. As shown in FIG. 2, when plural images are inputted (Step S1), the image-processing circuit 17 performs resolution-reducing conversion of the plural images to obtain plural coarse images (step S2), and searches for a local motion vector from each block of the coarse images (step S3).

Thereafter, the image-processing circuit 17 elects representative motion vectors (step S4) from the local motion vectors, and approximates a motion vector distribution on images based on the representative motion vectors (step S5). The processing of the aforementioned steps S2 to S5 is detection based on coarse images, and hence corresponds to "coarse detection".

Then, the image-processing circuit 17 uses the motion vector distribution obtained by the coarse detection to search for a local motion vector freshly from each block of plural detailed images before being subjected to the resolution-reducing conversion (step S6). The processing of this step S6 is based on detailed images, and hence corresponds to "detail detection".

Furthermore, the image-processing circuit 17 position-adjusts and composes the plural detailed images based on the local motion vector obtained in the step S6 (step S7), and outputs the image after the composition as the stabilized image (step S8).

Next, steps S3 to S7 will be explained in detail. Here, for simplicity, it is assumed that the number of images is two.

(Step S3)

FIG. 3 is a view explaining the principle of step S3. As shown in FIG. 3, in this step, an edge-detecting filter processing is performed on each of the coarse images $f_1$, $f_2$ to obtain edge images $g_1$, $g_2$. Then, each of the edge images $g_1$, $g_2$ is divided in plural blocks R. The number of blocks R is 24 in total for example, that is, 6 blocks in a horizontal direction of an image and 4 blocks in a vertical direction of an image. Hereinafter, the horizontal direction of an image (left and right direction in the drawings) will be called an "x-direction", and the vertical direction of an image (upward and downward direction in the drawings) will be called a "y-direction". A search for a local motion vector from the blocks R is performed as follows.

First, as shown by enlargement in FIG. 3, reference areas $E_1$, $E_2$ in blocks R of the edge images $g_1$, $g_2$ are referred respectively, and the absolute value of a difference between the reference areas $E_1$, $E_2$ is calculated as a correlation value d between the reference areas $E_1$, $E_2$. The calculation of the correlation value d is repeated while varying a position shift amount (x-direction: α, y-direction: β) between the reference areas $E_1$, $E_2$.

A variation range (search range) of this position shift amount (α, β) is set sufficiently wide. For example, when the size of each of the reference areas $E_1$, $E_2$ is 75 pixels×75 pixels, the search range is set to α: ±15 pixels, β: ±15 pixels.

Then, in this search range, values (Δx, Δy) of the position shift amount (α, β) with which the correlation value d becomes a minimum are found out. These values (Δx, Δy) are considered as a local motion vector V of the blocks R.

However, in the above search, the operation amount increases when the reference areas $E_1$, $E_2$, which are two-dimensional data, are used as they are in the operation, and thus it is preferable to use, instead of the reference areas $E_1$, $E_2$, one-dimensional projected data created by adding the reference areas $E_1$, $E_2$ in the y-direction and one-dimensional projected data created by adding the reference areas $E_1$, $E_2$ in the x-direction.

FIG. 4 is a view explaining the step S3 when using the projected data.

As shown in FIG. 4, in this case, the edge-detecting filter processing in the x-direction is performed on the coarse images $f_1$, $f_2$, to obtain edge images $g_1v$, $g_2v$, and the edge-detecting filter processing in the y-direction is performed on the coarse images $f_1$, $f_2$ to obtain edge images $g_1h$, $g_2h$. Note that edge components of the y-direction appear in the edge images $g_1v$, $g_2v$, and edge components of the x-direction appear in the edge images $g_1h$, $g_2h$.

Among them, as shown by enlargement in FIG. 4, a reference area $E_1$ of the edge image $g_1v$ is added in the y-direction to create projected data $L_1h$.

Further, a reference area $E_2$ of the edge image $g_2v$ is added in the y-direction to create projected data $L_2h$.

Further, a reference area $E_1$ of the edge image $g_1h$ is added in the x-direction to create projected data $L_1v$.

Further, a reference area $E_2$ of the edge image $g_2h$ is added in the x-direction to create projected data $L_2v$.

In this case, the correlation value d between the reference areas $E_1$, $E_2$ is represented by the sum of the absolute value of a difference between the projected data $L_1h$, $L_2h$ and the absolute value of a difference between the projected data $L_1v$, $L_2v$.

Here, the projected data $L_1h$, $L_2h$, $L_1v$, $L_2v$ need to be created every time the position shift amount (α, β) of the reference areas $E_1$, $E_2$ changes. However, the operation amount becomes large when the reference areas $E_1$, $E_2$ are added every time the position shift amount (α, β) changes, and hence cumulative added images of the edge images $g_1v$, $g_2v$, $g_1h$, $g_2h$ may be created in advance.

Figure 5:
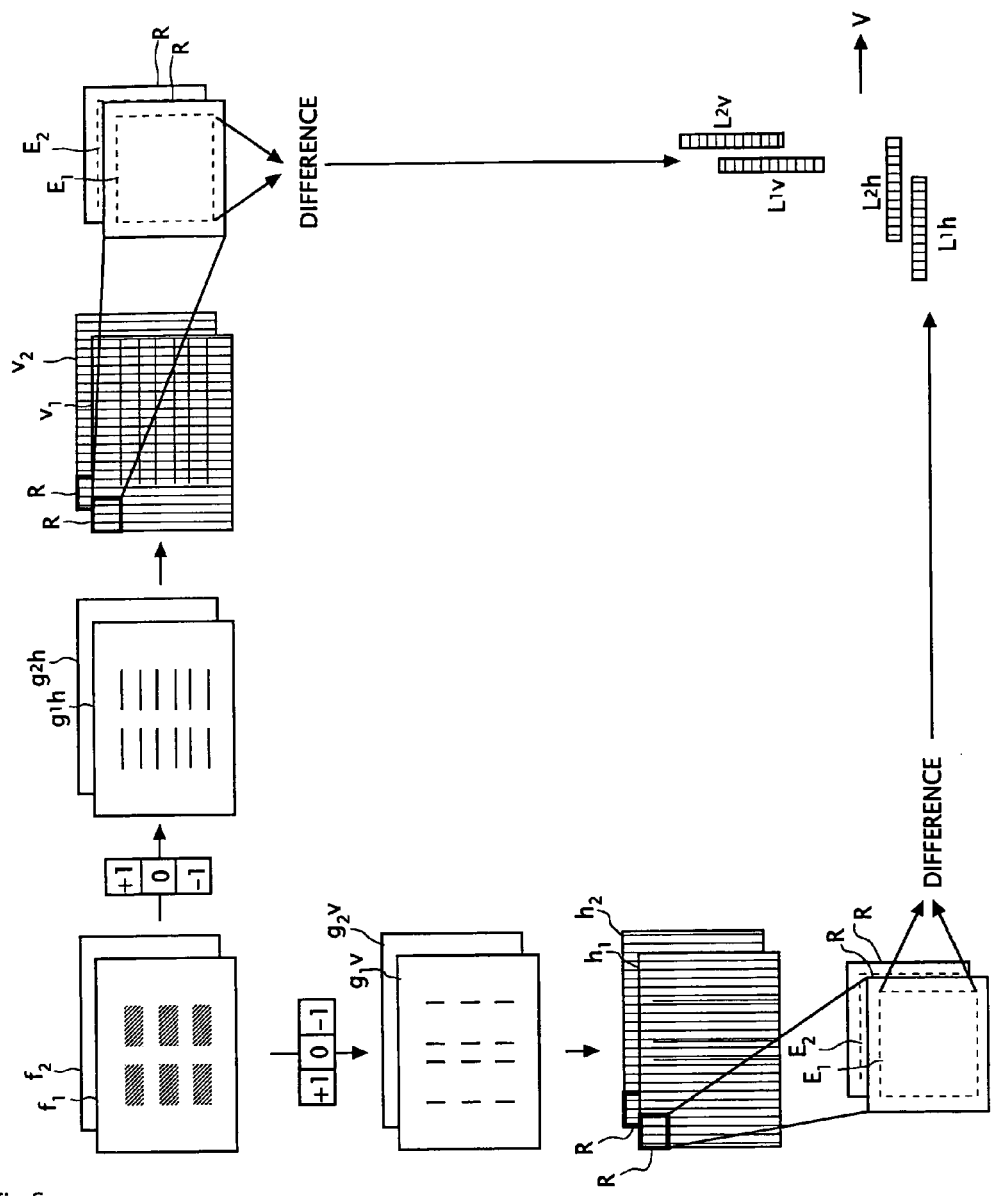
FIG. 5 is a view explaining the step S3 when using cumulative added images.

FIG. 5 is a view explaining the step S3 when the cumulative added images are used.

As shown in FIG. 5, also in this case, the edge images $g_1h$, $g_2h$, $g_1v$, $g_2v$ are obtained from the coarse images $f_1$, $f_2$, similarly to the case in FIG. 4.

Among the edge images, the edge image $g_1v$ is cumulatively added in the y-direction to create a cumulative added image $h_1$.

Further, the edge image $g_2v$ is cumulatively added in the y-direction to create a cumulative added image $h_2$.

Further, the edge image $g_1h$ is cumulatively added in the x-direction to create a cumulative added image $v_1$.

Further, the edge image $g_2h$ is cumulatively added in the x-direction to create a cumulative added image $v_2$.

To denote specifically, calculation equations for these cumulative added images $h_1$, $h_2$, $v_1$, $v_2$ are as follows.

$$h_1(x, y) = \sum_{x'=0}^{x} g_{1v}(x', y) \quad v_1(x, y) = \sum_{y'=0}^{y} g_{1h}(x, y') \quad \text{[Equation 1]}$$

$$h_2(x, y) = \sum_{x'=0}^{x} g_{2v}(x', y) \quad v_2(x, y) = \sum_{y'=0}^{y} g_{2h}(x, y')$$

Then, as shown by enlargement in FIG. 5, the aforementioned projected data $L_1h$ are created by taking a difference between two top and bottom lines in a reference area $E_1$ of the cumulative added image $h_1$.

Further, the aforementioned projected data $L_2h$ are created by taking a difference between two top and bottom lines in a reference area $E_2$ of the cumulative added image $h_2$.

Further, the aforementioned projected data $L_1v$ are created by taking a difference between two left and right lines in a reference area $E_1$ of the cumulative added image $v_1$.

Further, the aforementioned projected data $L_2v$ are created by taking a difference between two left and right lines in a reference area $E_2$ of the cumulative added image $v_2$.

Therefore, in this case, the correlation value d between the reference areas $E_1$, $E_2$ is calculated by a small operation amount with the following equation. Here, B is the block size.

$$d(\alpha, \beta) = \sum_{i=\alpha}^{\alpha+B} |\{h_1(i, B) - h_1(i, 0)\} - \quad \text{[Equation 2]}$$
$$\{h_2(i, B + \beta) - h_2(i, \beta)\}| +$$
$$\sum_{j=\beta}^{\beta+B} |\{v_1(B, j) - v_1(0, j)\} -$$
$$\{v_2(B + \alpha, j) - v_2(\alpha, j)\}|$$

(Step S4)

Figure 6:
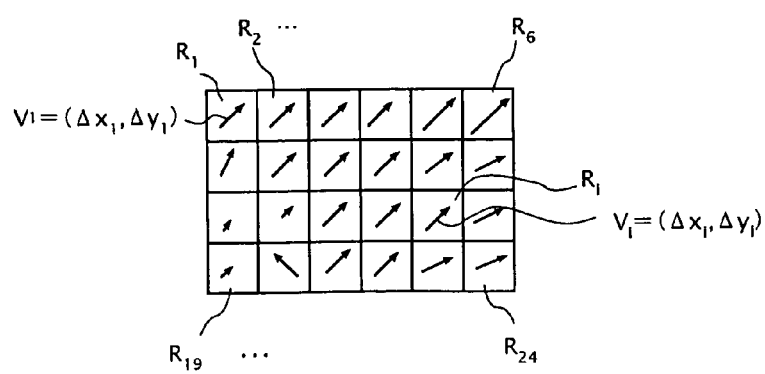
FIG. 6 is a view explaining step S4.

FIG. 6 is a view explaining step S4. In FIG. 6, denoted by reference letters $R_1$, $R_2$, . . . , $R_{24}$ are respective blocks in an image, and denoted by reference letters $V_1$, $V_2$, . . . , $V_{24}$ are images of local motion vectors searched individually from the blocks $R_1$, $R_2$, . . . , $R_{24}$. In this manner, hereinafter, the explanation will be given with the number of blocks R being 24, and a subscript denoting a block number being attached to each of amounts related to each of the blocks.

In this step, first the local motion vectors $V_1$, $V_2$, . . . , $V_{24}$ are evaluated. As evaluated values of each local motion vector $V_i$, for example, the following two types of evaluated values $\Delta E_i$, $e_i$ are used:

First Evaluated Value $\Delta E_i$

This value is the sum of correlation values $d_1$, $d_2$, . . . , $d_{24}$ of the respective blocks $R_1$, $R_2$, . . . , $R_{24}$ when a position shift amount substantially equivalent to values ($\Delta x_i$, $\Delta y_i$) of the local motion vector $v_i$ are applied tentatively to all the blocks $R_1$, $R_2$, . . . , $R_{24}$. It can be considered that the smaller the first evaluated value $\Delta E_i$, the higher the reliability of the local motion vector $V_i$.

However, when obtaining a correlated value $d_k$ of blocks $R_k$, it is desirable to perform the following search. Specifically, the correlation value d is calculated while varying the position shift amount (α, β) of the blocks $R_k$ in a narrow range in the vicinity of the values ($\Delta x_i$, $\Delta y_i$) equivalent to the local motion vector $V_i$, and the smallest value of the correlation value d at this time is assumed as the correlation value $d_k$ of the blocks $R_k$. A variation range (search range) thereof is, for example, α: $\Delta x_i \pm 2$ pixels, β: $\Delta y_i \pm 2$ pixels.

Note that to denote specifically, a calculation equation for the first evaluated value $\Delta E_i$ is as follows (however, the number of blocks is 24).

$$\Delta E_i = \sum_{k=1}^{24} \min_{\alpha=\Delta x_i \pm 2, \beta=\Delta y_i \pm 2} [d_k(\alpha, \beta)] \qquad \text{[Equation 3]}$$

Second Evaluated Value $e_i$

This value is an edge amount of the block $R_i$ which is the source for search of the local motion vector $V_i$. For example, this value is the mean value of the absolute values of two edge components of the block $R_i$ obtained by the edge-detecting filter processing in the x-direction and the edge-detecting filter processing in the y-direction. It can be considered that the larger the second evaluated value $e_i$, the higher the reliability of the local motion vector $V_i$.

Now, in this step, the first evaluated value $\Delta E_i$ is generated for each of the local motion vectors $V_1, V_2, \ldots, V_{24}$, and the local motion vectors $V_1, V_2, \ldots, V_{24}$ are sorted in ascending numeric order of the first evaluated values $\Delta E_i$. However, regarding local motion vectors having the same first evaluated values $\Delta E_i$ as each other, second evaluated values $e_i$ are generated further, and the local motion vectors are sorted in descending numeric order of the second evaluated values $e_i$.

Figure 7:
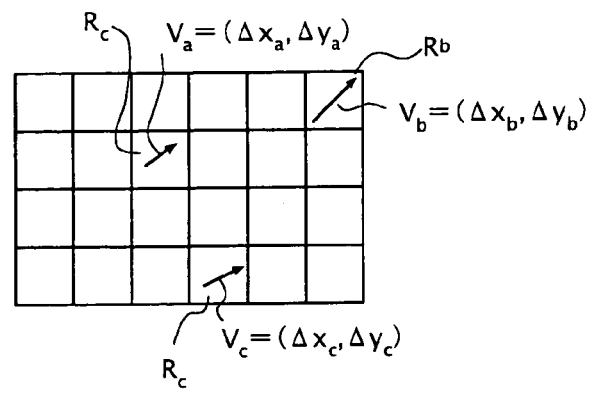
FIG. 7 is a view showing representative motion vectors $V_a$, $V_b$, $V_c$.

The local motion vector which is ranked first as a result of the above sorting is elected as a first representative motion vector $V_a$ (refer to FIG. 7).

Further, from the local motion vector which is ranked second or later local motion vectors, there are elected a second representative motion vector $V_b$ and a third representative motion vector $V_c$ (refer to FIG. 7) which satisfy the following conditions:

The center coordinates of the blocks $R_a, R_b, R_c$, which are sources of searches for the representative motion vectors $V_a, V_b, V_c$, do not exist on the same straight line.

{Area of a triangle connecting center coordinates of the blocks $R_a, R_b, R_c$}*{Sum of second evaluated values $e_a, e_b, e_c$ of the representative motion vectors $V_a, V_b, V_c$} is the largest.

The sum of the first evaluated values $\Delta E_a, \Delta E_b, \Delta E_c$ of the representative vectors $V_a, V_b, V_c$ is the same as the sum of the first evaluated values of the local motion vectors at the top three ranks.

(Step S5)

Figure 8:
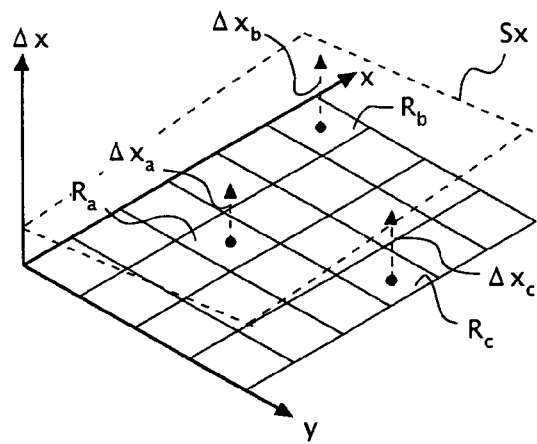
FIG. 8 is a view showing an approximate plane Sx of $\Delta x$.
Figure 9:
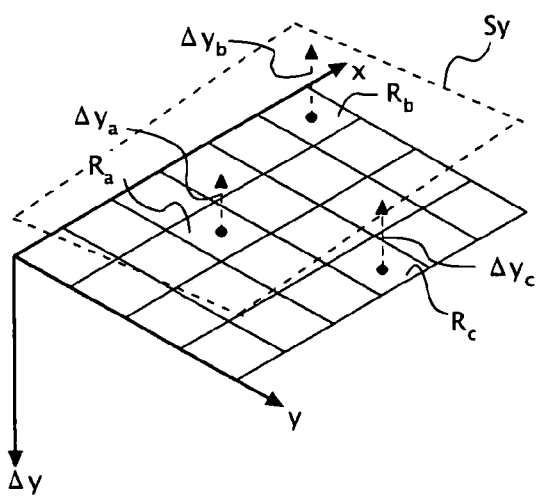
FIG. 9 is a view showing an approximate plane Sy of $\Delta y$.

FIG. 8, FIG. 9 are views explaining step S5.

In this step, as shown in FIG. 8, a distribution of an x-component $\Delta x$ of a local motion vector $V$ on an image is approximated based on x-components $\Delta x_a, \Delta x_b, \Delta x_c$ of the representative motion vectors $V_a, V_b, V_c$.

FIG. 8 shows three-dimensional coordinates includes two-dimensional coordinates (x, y) and a one-dimensional coordinate in the $\Delta x$ direction on the image. At this time, the distribution of $\Delta x$ is approximated by a plane Sx as shown by dotted lines in FIG. 8.

This plane Sx is a plane that passes three sets of coordinates $(x_a, y_a, \Delta x_a)$, $(x_b, y_b, \Delta x_b)$, $(x_c, y_c, \Delta x_c)$ when the center coordinates of the block $R_a$ are $(x_a, y_a, 0)$, the center coordinates of the block $R_b$ are $(x_b, y_b, 0)$, and the center coordinates of the block $R_c$ are $(x_c, y_c, 0)$. That is, the plane Sx is specified by the following linear equation with three constants $A_1, A_2, A_3$, which are determined from the aforementioned three sets of coordinates.

$$Sx:\Delta x = A_1 x + A_2 y + A_3$$

Similarly, in this step, as shown in FIG. 9, a distribution of a y-component $\Delta y$ of the local motion vector $V$ on the image is approximated based on y-components $\Delta y_a, \Delta y_b, \Delta y_c$ of the representative motion vectors $V_a, V_b, V_c$.

FIG. 9 shows three-dimensional coordinates includes two-dimensional coordinates (x, y) and a one-dimensional coordinate in the $\Delta y$ direction on the image. At this time, the distribution of $\Delta y$ is approximated by a plane Sy as shown by dotted lines in FIG. 9.

This plane Sy is a plane that passes three sets of coordinates $(x_a, y_a, \Delta y_a)$, $(x_b, y_b, \Delta y_b)$, $(x_c, y_c, \Delta y_c)$. The plane Sy is specified by the following linear equation with three constants $B_1, B_2, B_3$, which are determined from the aforementioned three sets of coordinates.

$$Sy:\Delta y = B_1 x + B_2 y + B_3$$

By the two planes Sx, Sy as above, the motion vector distribution on the image is represented.

Figure 10:
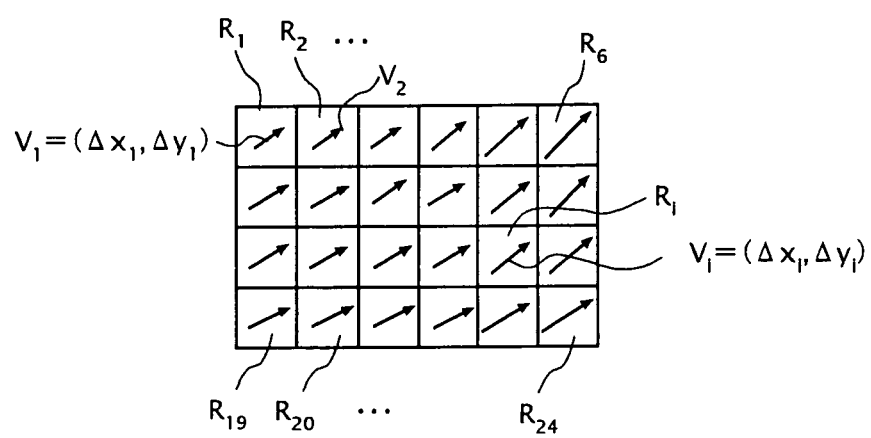
FIG. 10 is a view showing an example of local motion vectors $V_i$ after replacement.

Here, when the values of the aforementioned local motion vectors $V_1, V_2, \ldots, V_{24}$ are replaced according to the motion vector distribution represented by the two planes Sx, Sy, results are as shown in FIG. 10 for example. The distribution in the x-direction and the distribution in the y-direction of the local motion vectors $V_1, V_2, \ldots, V_{24}$ after the replacement both become linear.

(Step S6)

In this step, the local motion vectors $V_1, V_2, \ldots, V_{24}$ after the replacement are used to search for the local motion vectors $V_1, V_2, \ldots, V_{24}$ freshly from the blocks $R_1, R_2, \ldots, R_{24}$ of the two detailed images before being subjected to the resolution-reducing conversion.

Upon the search, the same processings (edge-detecting filter processing, conversion into cumulative added images) as those performed on the two coarse images are performed on the two detailed images.

Further, since the general search is already finished by the coarse detection with the coarse images, a search range (variation range of the position shift amount ($\alpha, \beta$)) of each block $R_i$ is limited to the vicinity of values ($\Delta x_i, \Delta y_i$) of the local motion vector $V_i$ after the replacement. For example, when the sizes of the reference areas $E_1, E_2$ are 200 pixels× 200 pixels, the search range is set to $\alpha$: $\Delta x_i \pm 6$ pixels, $\beta$: $\Delta y_i \pm 6$ pixels. Thus, when the search range is limited to a narrow range, the operation amount required for the search can be reduced.

However, since the local motion vector $V_i$ after the replacement is obtained from the coarse images, it is counted by a small size. Therefore, the values ($\Delta x_i, \Delta y_i$) need to be corrected before the search. In this correction, the values ($\Delta x_i, \Delta y_i$) may be multiplied by a coefficient equal to the size ratio of the detailed image to the coarse image.

Under the above conditions, the local motion vectors $V_1, V_2, \ldots, V_{24}$ are searched freshly from the respective blocks $R_1, R_2, \ldots, R_{24}$. The local motion vectors $V_1, V_2, \ldots, V_{24}$ searched in this step are definitive local motion vectors.

(Step S7)

In this step, the blocks $R_1, R_2, \ldots, R_{24}$ of the two detailed images are position-adjusted and configured according to the definitive local motion vectors $V_1, V_2, \ldots, V_{24}$. Accordingly, one stabilized image is completed. Note that in this composition, necessary positions of the image are interpolated with pixels.

In this manner, when the position adjustment of an image is performed for every block, the definitive local motion vectors $V_1, V_2, \ldots, V_{24}$ are used effectively, and thereby it becomes possible to handle cases such that a rotor component is generated in motion between two images, that zoom component is generated, and the like (end of step S7).

As above, in the image stabilization processing of this embodiment, since the motion vector distribution is approximated based on the representative motion vectors having high reliability (steps S3 to S5), motion between images can be represented precisely without increasing the number of blocks. Moreover, since the approximate surface is a plane, the operation amount for approximating the motion vector distribution and the information amount for representing the motion vector distribution can be minimized.

Further, in the image stabilization processing of this embodiment, since the projected data are used to search for the local motion vector, the operation amount related to the search can be reduced more than by using the edge images as they are. Moreover, since the cumulative added images are created in advance, the operation amount related to creation of the projected data can be reduced as well.

Further, in the image stabilization processing of this embodiment, the general motion vector distribution is obtained based on the coarse images (step S2 to S5) in advance, and motion in detailed images is detected using the general motion vector distribution with a small operation amount (step S6). Therefore, not only the motion can be detected with high precision, but also the operation amount required for the detection can be reduced.

(Other Matters)

Note that in the steps S3, S6, since the edge-detecting filter processing is adopted as the type of filter processing, the edge information are the feature quantity extracted from the blocks, but another type of filter processing may be adopted so as to replace the feature quantity extracted from the blocks with another feature quantity indicating a pattern in the blocks.

Further, in the step S4, the combination of the above-described first evaluated value and second evaluated value is used for electing the representative motion vectors $V_a, V_b, V_c$, but the combination may be replaced with another combination as long as it indicates the reliability of a local motion vector.

Further, in the steps S4, S5, the three representative motion vectors $V_a, V_b, V_c$ are used for approximating the motion vector distribution by a plane, but four or more representative motion vectors may be used.

Further, in the steps S4, S5, the approximated surface for the motion vector distribution is a plane, but it may be a curved surface. With a curved surface, motion between images can be represented in more detail. However, as the number of order of the approximated surface increases, the number of representative motion vectors to be elected in the step S4 increases as well.

Further, in the image stabilization processing of this embodiment, the motion vector distributions of the coarse images are approximated (steps S3 to S5), and then the motion vectors for the detailed images are searched freshly (step S6), but the similar approximation processing (steps S3 to S5) may be performed on the detailed images directly. However, dividing in two phases as in this embodiment is more efficient.

Further, in this embodiment, the image stabilization processing is executed by a circuit (image-processing circuit 17) in the electronic still camera, but a part or all of the image stabilization processing may be executed by another imaging apparatus such as a video camera, various types of image input apparatuses, a computer, or the like. In addition, when using a computer to execute the processing, a program for executing the processing may be installed in the computer.

Second Embodiment

Hereinafter, a second embodiment of the present invention will be explained. This embodiment is an embodiment of a motion vector detection processing.

Here, again for simplicity, the number of images are two, and the target of detection is a motion vector in a block in the two images. Further, the coordinates and size of the block are arbitrary. Therefore, when the size of the block is set large, motion vectors of the entire two images can be detected. In addition, when the block is divided into plural blocks and a motion vector (=local motion vector) of each block is detected, this detection processing can be applied to the step S3 in the first embodiment.

Figure 11:
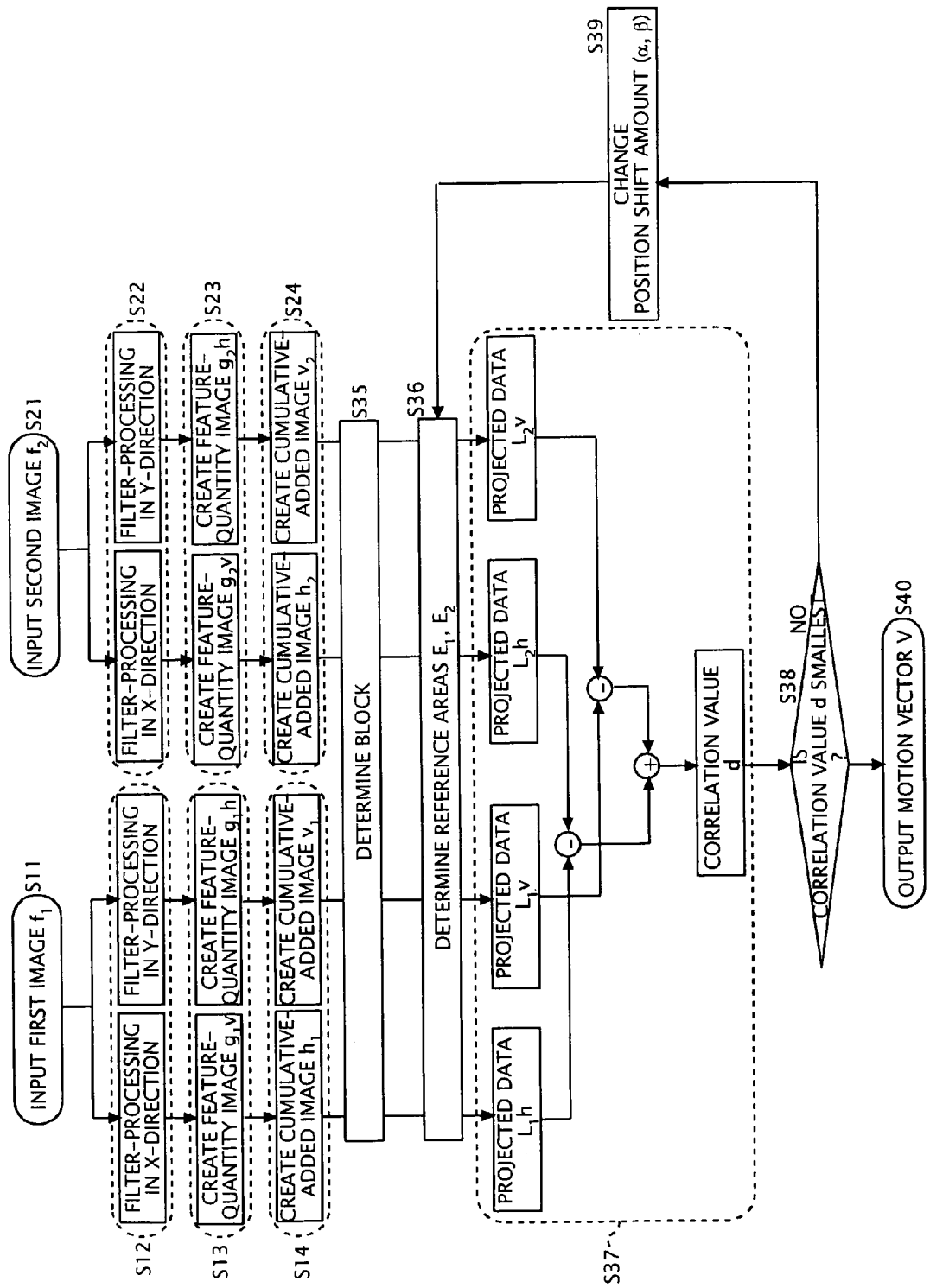
FIG. 11 is a flowchart showing a flow of a detection processing in a second embodiment.

FIG. 11 is a flowchart showing the flow of the detection processing of this embodiment. The respective steps will be explained in detail.

(Steps S11, S21)

In these steps, two images $f_1(x, y)$, $f_2(x, y)$ obtained at an infinitesimal time interval are inputted.

(Steps S12, S22)

In these steps, an edge-detecting filter processing is performed on each of the two images $f_1(x, y)$, $f_2(x, y)$. Filter outputs $g_1v(x, y)$, $g_1h(x, y)$ in the vertical/horizontal directions (x/y-directions) for the first image $f_1(x, y)$, and filter outputs $g_2v(x, y)$, $g_2h(x, y)$ in the vertical/horizontal directions (x/y-directions) for the second image $f_2(x, y)$ are represented by the following equations respectively:

$$g_1v(x,y)=-f_1(x,y-2)-f_1(x,y-1)+f_1(x,y+1)+f_1(x,y+2)$$

$$g_2v(x,y)=-f_2(x,y-2)-f_2(x,y-1)+f_2(x,y+1)+f_2(x,y+2)$$

$$g_1h(x,y)=-f_1(x-2,y)-f_1(x-1,y)+f_1(x+1,y)+f_1(x+2,y)$$

$$g_2h(x,y)=-f_2(x-2,y)-f_2(x-1,y)+f_2(x+1,y)+f_2(x+2,y)$$

In these equations, the filter output $g_1v(x, y)$ corresponds to the edge image $g_1v(x, y)$ explained in the first embodiment (FIG. 5), the filter output $g_2v(x, y)$ corresponds to the edge image $g_2v(x, y)$ explained in the first embodiment, the filter output $g_1h(x, y)$ corresponds to the edge image $g_1h(x, y)$ explained in the first embodiment, and the filter output $g_2h(x, y)$ corresponds to the edge image $g_2h(x, y)$ explained in the first embodiment.

Figure 12:
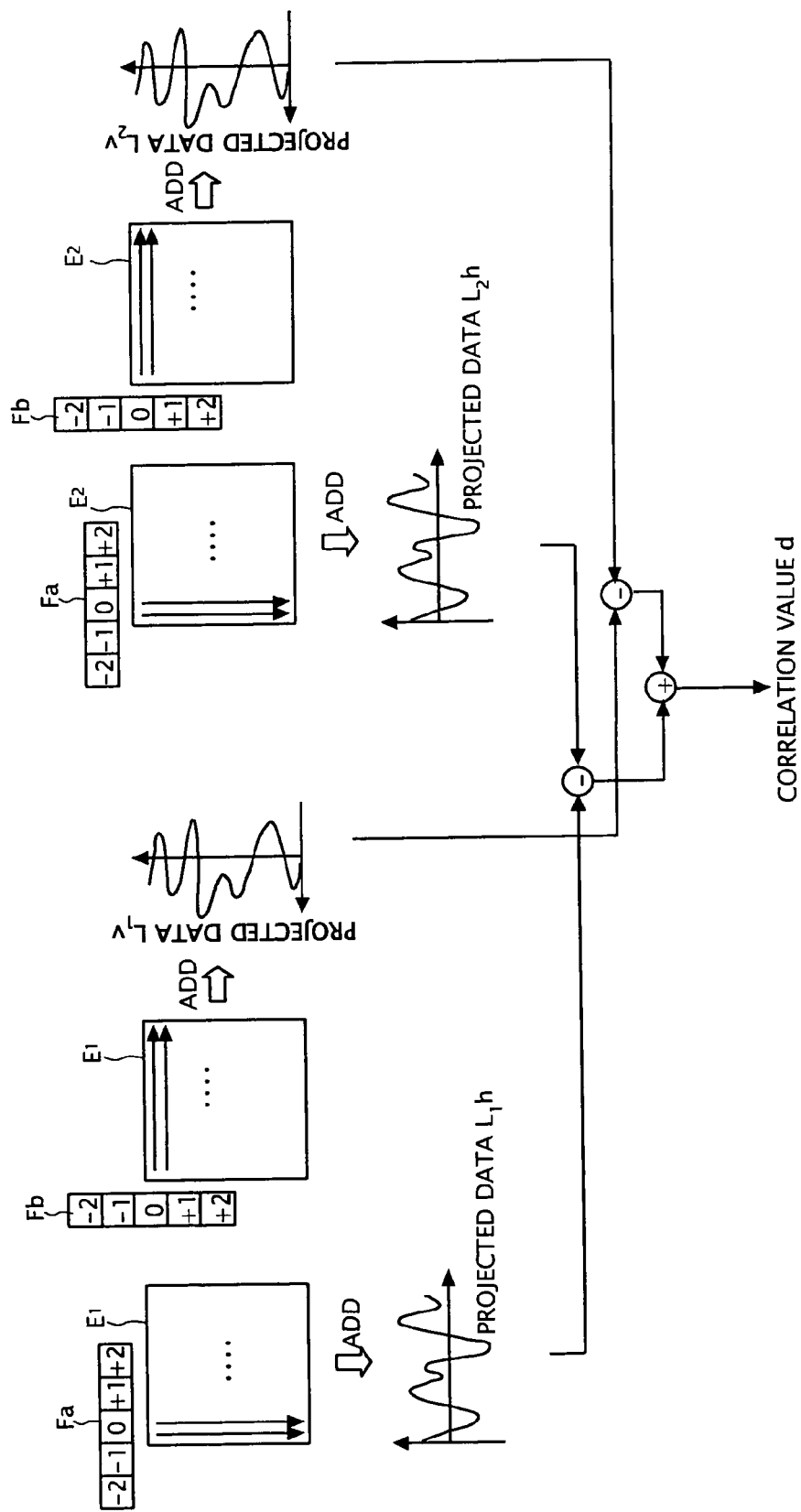
FIG. 12 is a view explaining a concept of a method of calculating a correlation value d of the second embodiment (and the first embodiment).

However, the edge-detecting filter processing with the above equations supposes edge filters Fa, Fb as shown in FIG. 12, which have different sizes from the edge filters shown in FIG. 5.

Furthermore, in these steps, another processing is combined with such an edge-detecting filter processing. For example, a noise-reducing processing is combined. The noise-reducing processing compares respective pixel values of the aforementioned filter outputs $g_1v(x, y)$, $g_1h(x, y)$, $g_2v(x, y)$, $g_2h(x, y)$ with a predetermined threshold value, and replaces a pixel value that is equal to or lower than the threshold value with zero. Thus, noise in the filter outputs $g_1v(x, y)$, $g_1h(x, y)$, $g_2v(x, y)$, $g_2h(x, y)$ is reduced.

(Steps S13, S23)

In these steps, images are created by the filter outputs $g_1v(x, y)$, $g_2v(x, y)$, $g_1h(x, y)$, $g_2h(x, y)$ respectively after the noise reduction. Hereinafter, the created images are referred to as feature-quantity images $g_1v(x, y)$, $g_2v(x, y)$, $g_1h(x, y)$, $g_2h(x, y)$. However, for reducing the amount of the memory to be used, it is also possible to omit these steps and use the filter outputs $g_1v(x, y)$, $g_2v(x, y)$, $g_1h(x, y)$, $g_2h(x, y)$ as they are in the next step.

(Steps S14, S24)

In these steps, cumulative added images $h_1(x, y)$, $h_2(x, Y)$, $v_1(x, y)$, $v_2(x, y)$ are created based on the feature-quantity images $g_1v(x, y)$, $g_2v(x, y)$, $g_1h(x, y)$, $g_2h(x, y)$ respectively. Calculation equations for the cumulative added images $h_1(x, y)$, $h_2(x, y)$, $v_1(x, y)$, $v_2(x, y)$ are the same as those explained in the first embodiment and are as follows.

$$h_1(x, y) = \sum_{x'=0}^{x} g_{1v}(x', y) \quad v_1(x, y) = \sum_{y'=0}^{y} g_{1h}(x, y')$$

$$h_2(x, y) = \sum_{x'=0}^{x} g_{2v}(x', y) \quad v_2(x, y) = \sum_{y'=0}^{y} g_{2h}(x, y')$$

[Equation 4]

(Step S35)

In this step, center coordinates (cx, cy) of a block to be a source of search for a motion vector and sizes (Bx, By) thereof are determined. Bx is a size in the x-direction, and By is a size in the y-direction. In addition, when setting the source of search for a motion vector to the entire image, the center coordinates of the block may be set as the center coordinates of the image, and match the size of the block with the size of the entire image.

(Step S36)

In this step, a reference area $E_1$ in a block in the first image $f_1$ and a reference area $E_2$ in a block in the second image $f_2(x, y)$ are set. However, sizes of the reference areas $E_1$, $E_2$ are in common and the coordinates of the reference area $E_1$ in the block are fixed, and hence only a position shift amount ($\alpha$, $\beta$) of the reference area $E_2$ with the reference area $E_1$ being the basis needs to be set here.

(Step S37)

In this step, a correlation value $d(\alpha, \beta)$ between the reference areas $E_1$, $E_2$ is calculated. The method of calculating the correlation value $d(\alpha, \beta)$ is basically the same as in the first embodiment. Specifically, in this step, as shown conceptually in FIG. 12, projected data $L_1h$, $L_1v$ in the x/y directions of the reference area $E_1$ are created, similar projected data $L_2v$, $L_2h$ are created also for the reference area $E_2$, and these four types of projected data $L_{1h}$, $L_{1v}$, $L_{2h}$, $L_{2v}$ are added and/or subtracted to calculate the correlation value $d(\alpha, \beta)$.

Then, also in this step, the cumulative added images $h_1(x,y)$, $h_2(x,y)$, $v_1(x,y)$, $v_2(x,y)$ are used for calculating the projected data $L_{1h}$, $L_{1v}$, $L_{2h}$, $L_{2v}$. However, in this step, since the center coordinates (cx, cy) and the sizes (Bx, By) of the block are arbitrary, the following equation, which is made by generalizing the calculation equation explained in the first embodiment, is used for calculating the correlation value $d(\alpha, \beta)$:

$$d(\alpha, \beta) = \sum_{i=c_x-B_x/2}^{c_x+B_x/2} |\{v_1(i, c_y + B_y/2) - v_1(i, c_y - B_y/2)\} - \{v_2(i+\alpha, c_y + B_y/2 + \beta) - v_2(i+\alpha, c_y - B_y/2 + \beta)\}| + \sum_{j=c_y-B_y/2}^{c_y+B_y/2} |\{h_1(c_x + B_x/2, j) - h_1(c_x - B_x/2, j)\} - \{h_2(c_x + B_x/2 + \alpha, j+\beta) - h_2(c_x - B_x/2 + \alpha, j+\beta)\}|$$

[equation 5]

(Steps S38, S39)

The calculation of the correlation value $d(\alpha, \beta)$ as above is repeated while varying the position shift amount ($\alpha$, $\beta$).

(Step S40)

In this step, values ($\Delta x$, $\Delta y$) of the position shift amount ($\alpha$, $\beta$) with which the correlation value $d(\alpha, \beta)$ becomes a minimum are found out, and these values ($\Delta x$, $\Delta y$) are outputted as the motion vector V. Thus, the motion vector detection processing is completed.

As above, also in this embodiment, since the projected data $L_{1h}$, $L_{1v}$, $L_{2h}$, $L_{2v}$ are used in the search for the motion vector V (steps S36 to S39), the operation amount related to the search can be reduced more than by using the feature-quantity images $g_1v(x, y)$, $g_2v(x, y)$, $g_1h(x, y)$, $g_2h(x, y)$ as they are. Moreover, since the cumulative added images $h_1(x, y)$, $h_2(x, y)$, $v_1(x, y)$, $v_2(x, y)$ are created in advance in the steps S14, S24, the operation amount related to creation of the projected data $L_{1h}$, $L_{1v}$, $L_{2h}$, $L_{2v}$ and further to calculation of the correlation value $d(\alpha, \beta)$ (step S37) can be reduced as well.

Therefore, in this embodiment, the search for the motion vector V (steps S36 to S39) are performed quickly.

Further, in the steps S12, S22 of this embodiment, since two or more processings including the edge-detecting filter processing are performed on the images $f_1(x, y)$, $f_2(x, y)$, feature-quantity images $g_1v(x, y)$, $g_2v(x, y)$, $g_1h(x, y)$, $g_2h(x, y)$ can be obtained in good state. Therefore, in this embodiment, the motion vector V can be detected with high precision.

(Other Matters)

Note that in the above-described steps S12, S22, the edge-detecting filter processing is adopted for extracting the edge information, but another type of filter processing may be adopted as long as it is capable of extracting the feature quantity.

Further, the detecting method of this embodiment processes plural inputted images, but images made by resolution-reducing conversion of plural inputted images may be processed similarly.

Further, the detecting method of this embodiment is applicable to an image stabilization method which position-adjusts and composes two images based on motion vectors of these images.

Further, the detecting method of this embodiment or an image stabilization method to which the detecting method is applied are executed by an imaging apparatus, an image input apparatus, a computer, or the like. When executing in a computer, a program for executing the processing thereof may be installed in the computer.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. An image-processing method which searches for a motion vector from between a comparison image and an object image, the method comprising:

a calculating operation of calculating a correlation between a reference area on said comparison image and a reference area on said object image while shifting a position of the reference area on said comparison image and a position of the reference area on said object image, wherein said correlation is a correlation between projected data of feature quantities in the reference area on said comparison image and projected data of feature quanities in the reference area on said object image, the projected data of said comparison image is created from a part of a cumulative added image of the feature quantities of said comparison image, and the projected data of said object image is created from a part of a cumulative added image of the feature quantities of said object image.

2. The image-processing method according to claim 1, wherein the feature quantities of said comparison image and said object image are extracted by performing two or more processes on said comparison image and said object image.

3. The image-processing method according to claim 2, wherein one of said two or more processes is an edge-detecting filter processing.

4. The image-processing method according to claim 1, wherein said motion vector is a motion vector of a block made by dividing said comparison image and said object image.

5. The image-processing method according to claim 1, wherein said motion vector is a motion vector of said entire comparison image and object image.

6. The image-processing method according to claim 1, wherein said correlation is a correlation between a first and a third projected data and a second and a fourth projected data, said first projected data is a result of adding the feature quantities in the reference area on said comparison image along a first direction, said second projected data is a result of adding the feature quantities in the reference area on said object image along said first direction, said third projected data is a result of adding the feature quantities in the reference area on said comparison image along a second direction, said fourth projected data is a result of adding the feature quantities in the reference area on said object image along said second direction, said first projected data is created from a part of a first cumulative added image prepared in advance, said second projected data is created from a part of a second cumulative added image prepared in advance, said third projected data is created from a part of a third cumulative added image prepared in advance, said fourth projected data is created from a part of a fourth cumulative added image prepared in advance, said first cumulative added image is a result of a cumulatively adding the feature quantities in said comparison image along said first direction, said second cumulative added image is a result of cumulatively adding the feature quantities in said object image along said first direction, said third cumulative added image is a result of cumulatively adding the feature quantities in said comparison image along said second direction, and said fourth cumulative added image is a result of cumulative adding the feature quantities in said object image along said second direction.

7. A non-transitory computer-readable recording medium storing an image-processing program configured to cause a computer to execute an image-processing method which searches for a motion vector from between a comparison image and an object image, the method comprising:

a calculating operation calculating a correlation between a reference area on said comparison image and a reference area on said object image while shifting a position of the reference area on said comparison image and a position of the reference area on said object image, wherein said correlation is a correlation between projected data of feature quantities in the reference area on said comparison image and projected data of feature quantities in the reference area on said object image, the projected data of said comparison image is created from a part of a cumulative added image of the feature quantities of said comparison image, and the projected data of said object image is created from a part of a cumulative added image of the feature quantities of said objected image.

8. An image-processing apparatus for searching for a motion vector from between a comparison image and an object image, the apparatus comprising:

a processor; and a memory, the memory comprising one or more operations, the one or more operations includes, a calculating operation calculating a correlation between a reference area on said comparison image and a reference area on said object image while shifting a position of the reference area on said comparison image and a position of the reference area on said object image, wherein said correlation is a correlation between projected data of feature quantities in the reference area on said comparison image and projected data of features quantities in the reference area on said object image, the projected data of said comparison image is created from a part of a cumulative added image of the feature quantities of said comparison image, and the projected data of said object image is created from a part of a cumulative added image of the feature quantities of said object image.

9. An imaging apparatus, comprising:

an imaging unit capable of continuously imaging a subject to obtain said comparison image and said object image; and the image-processing apparatus according to claim 8.

* * * * *